(No Model.)  3 Sheets—Sheet 1.
F. W. MORGAN.
PROCESS OF MANUFACTURING INFLATABLE AIR TUBES FOR PNEUMATIC TIRES.
No. 544,626.  Patented Aug. 13, 1895.
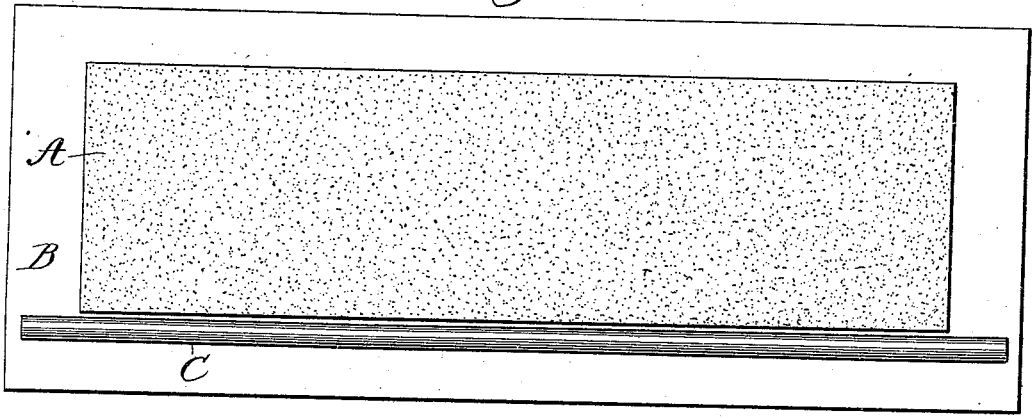
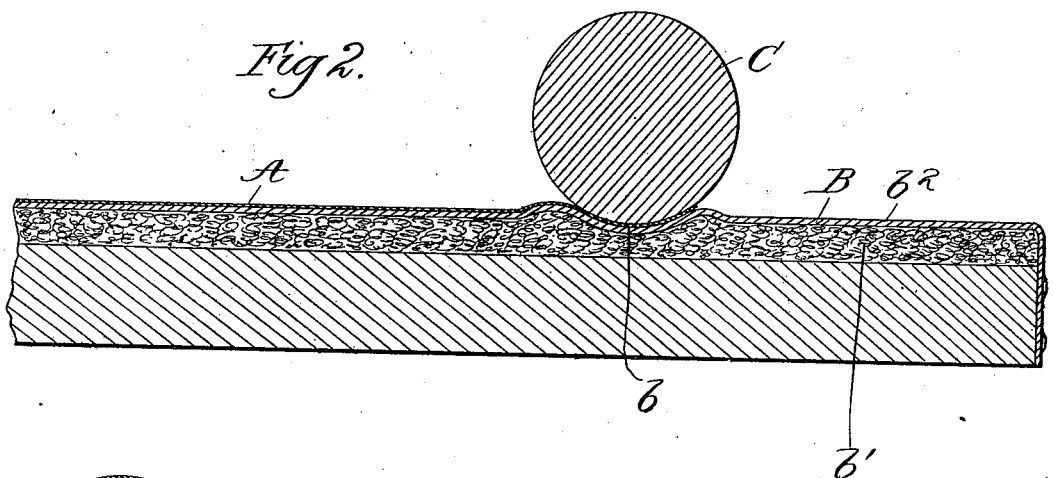
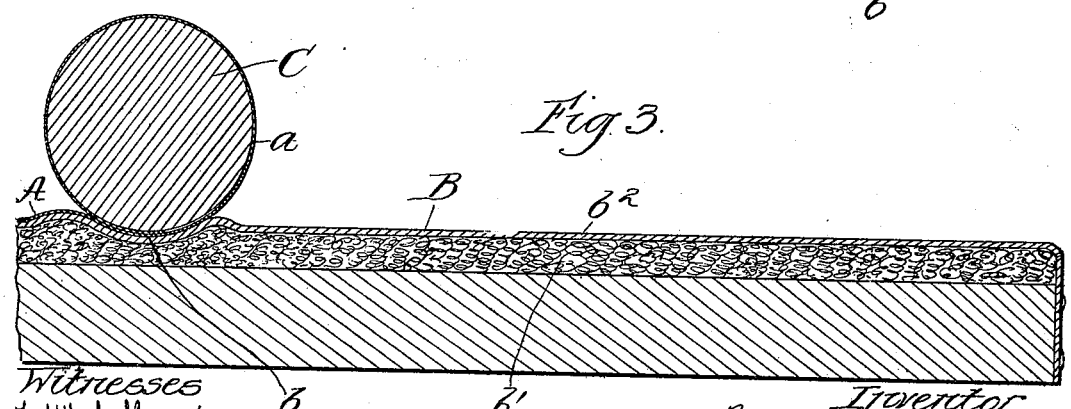

(No Model.) 3 Sheets—Sheet 2.
F. W. MORGAN.
PROCESS OF MANUFACTURING INFLATABLE AIR TUBES FOR PNEUMATIC TIRES.
No. 544,626. Patented Aug. 13, 1895.
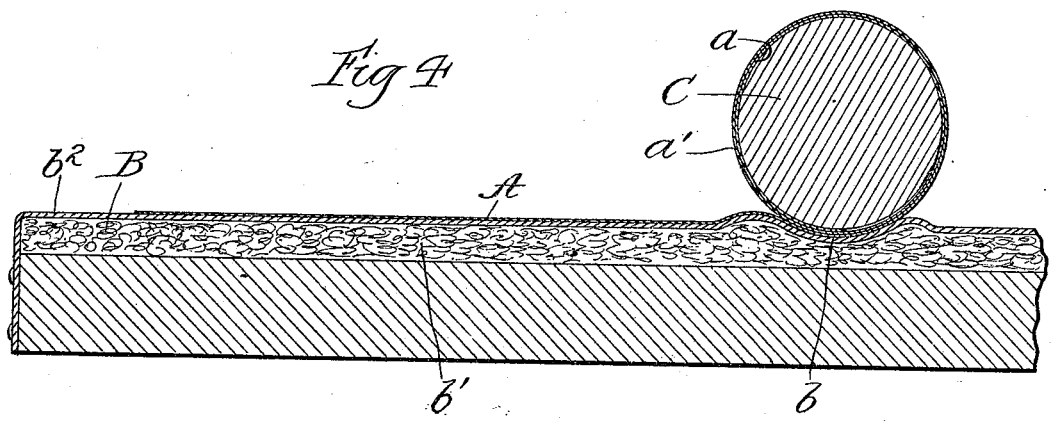
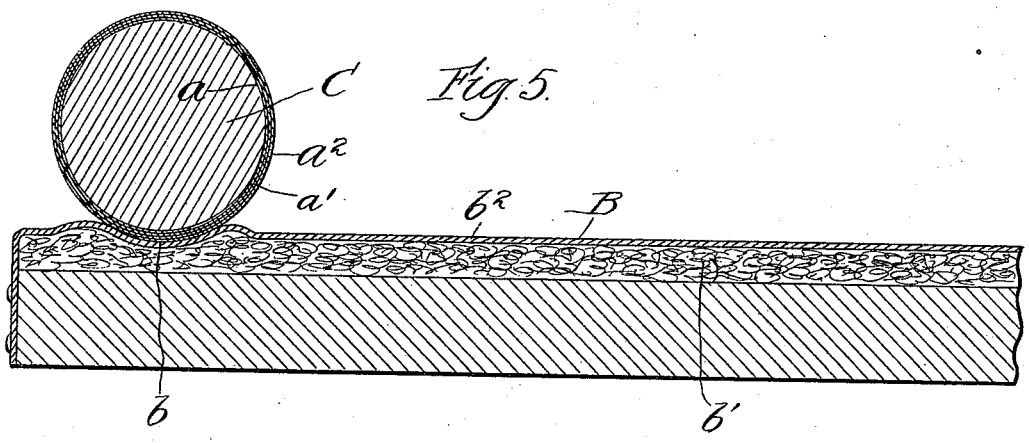
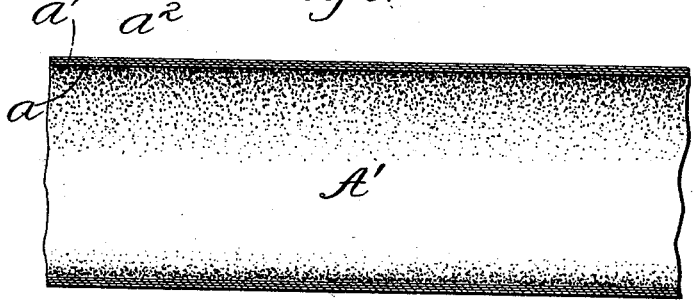
Witnesses
Wm. F. Henning
Belle Ewitt
Inventor
Fred W. Morgan
by Chas. G. Page
Atty.

(No Model.) 3 Sheets—Sheet 3.
F. W. MORGAN.
PROCESS OF MANUFACTURING INFLATABLE AIR TUBES FOR PNEUMATIC TIRES.
No. 544,626. Patented Aug. 13, 1895.
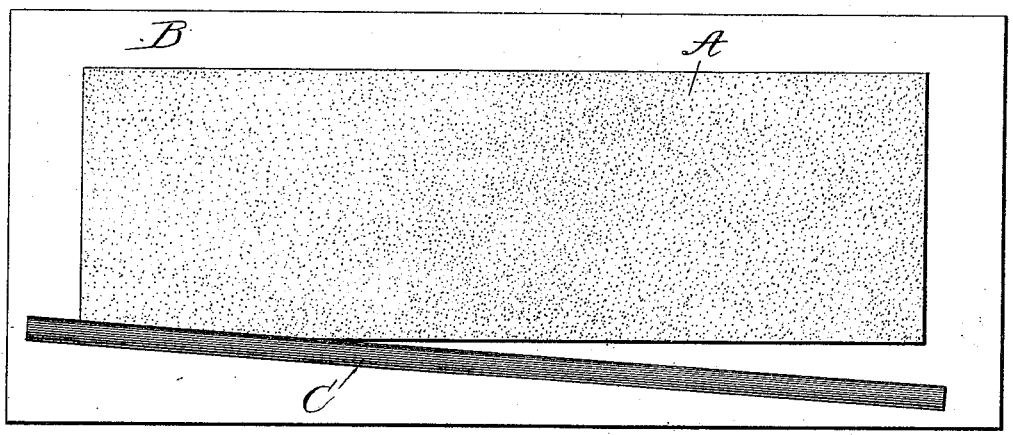
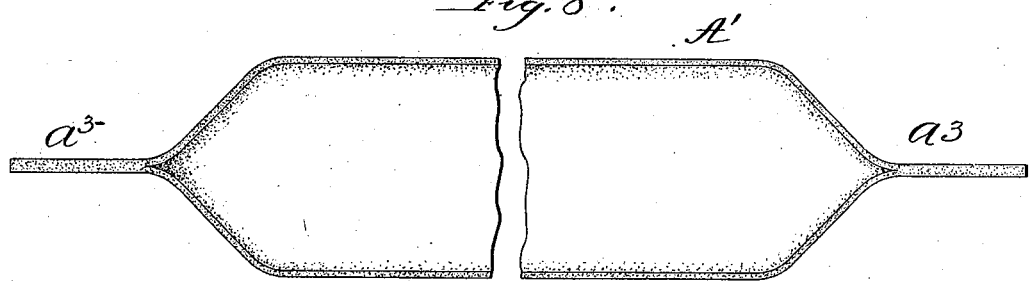
Witnesses
Inventor
Fred W. Morgan
By Chas. T. Page
Atty

UNITED STATES PATENT OFFICE.

FRED W. MORGAN, OF CHICAGO, ILLINOIS.

PROCESS OF MANUFACTURING INFLATABLE AIR-TUBES FOR PNEUMATIC TIRES.

SPECIFICATION forming part of Letters Patent No. 544,626, dated August 13, 1895.

Application filed July 14, 1894. Serial No. 517,572. (No model.)

*To all whom it may concern:*

Be it known that I, FRED W. MORGAN, a citizen of the United States, residing at Chicago, in the county of Cook and State of Illinois, have invented a certain new and useful Improvement in the Process of Manufacturing Inflatable Air-Tubes for Pneumatic Tires, of which the following is a specification.

Prominent objects of my invention are to produce a light, durable, and seamless inflatable air-tube for pneumatic tires involving a high degree of perfection, and to attain such results with certainty and in an economical, rapid, and highly efficient way. To the attainment of the foregoing and other useful ends I first form a sheet of adhesive rubber film of unvulcanized rubber and provide from such film a sheet of such width and length relatively to the proposed size and thickness of air-tube to be produced that it can be rolled upon and about a mandrel, so as to form a seamless multiple-ply or "multiply" (as it may be termed) tube of proper size and thickness. The provision of this sheet of rubber film insures a greater uniformity of perfection than is found in sheets of rubber of the thickness commonly adopted in the manufacture of air-tubes for pneumatic tires, it being extremely difficult and in fact not a practical matter in forming such sheets by passing the unvulcanized rubber between suitable rolls to produce perfect sheets of the thickness commonly used for tube-making. On the other hand, however, sheets of pure rubber film of, for example, one thirty-second or one sixty-fourth of an inch in thickness involving a high degree of perfection and integrity of texture throughout can be formed by thus passing unvulcanized rubber between suitable calender-rolls. The rubber film which I thus provide is, however, delicate, flimsy, and sticky and hard to handle. In order to handle this rubber film with ease and rapidity, and also to readily and rapidly roll the same into a multiply tube devoid of air-bubbles between its plies or layers, and possessing in general a high degree of perfection and general adaptability for long service, I roll the sheet of unvulcanized-rubber film upon and about a mandrel and also upon itself to an extent to form a multiply tube, and while thus rolling the film into tube form I subject it to an elastic yielding pressure or resistance in opposition to the mandrel, so as to directly unite the plies or layers of film smoothly and evenly and exclude air from between them. In order to successfully attain such yielding elastic pressure or resistance and at the same time insure rapidity and perfect work, I provide an elastic yielding, bed or "cushion-table," as I prefer to term it, upon which the sheet of film is laid in a spread-out condition, and I further provide a mandrel consisting simply of a long cylindric stick, which may be termed an "independent mandrel" for the reason that it is by itself and free to be handled by and at the will of the workmen. The mandrel is then rolled over the sheet by several operators with suitable manual pressure, which in effect secures in opposition to the mandrel an elastic yielding pressure or resistance. The film being thus rolled directly upon itself and being adhesive and perfectly pliable, will readily wrap about and conform to the shape of the mandrel, and hence when the mandrel is rolled over the sheet it will at the start take the film and roll up the same. During the initial portion of the operation of rolling the mandrel upon the film, whereby the first ply or layer is formed directly upon the mandrel, the elastic yielding surface upon which the film is first laid is noticeably of greater advantage than a hard, unyielding surface, since by exerting moderate down-pressure upon the mandrel the film will be compressed between the mandrel and an elastic or spring-yielding surface, which will yield under pressure along the length of the mandrel, and thereby cause the film, as a condition both desirable and precedent to the formation of the succeeding ply or plies, to wrap or roll smoothly and evenly upon the mandrel. During the formation of the succeeding ply or plies the compression between the first ply or layer and the elastic yielding surface of the film which is being taken up or rolled becomes a factor of vital importance and essential to the practically-successful production of a smoothly and evenly rolled multiply tube devoid of air-bubbles between its plies or layers, it being observed that if during the process of forming the tube one or more air-bubbles is or are caused or allowed to form at any point or points between the plies or layers the tube will be imperfect. By said mode, however, the outer ply or layer of film can be rolled up smoothly, evenly, compactly, and directly upon the next inner ply or layer of film and air can be effectively excluded from between them, even should any inequalities in thickness exist in the film from which the tube is formed, it being a fact that such inequalities will exist in such film, and although the same can be made more perfect than sheet-rubber it is not, so far as I know, commercially practical to turn it out otherwise. A feature of further and much importance, particularly during the formation of the second and any succeeding plies or layers, is the adaptability of the elastic yielding surface to permit the mandrel and intervening strata of film to be depressed into said surface, which under such pressure yields along the entire length of the mandrel and conforms to the same. In this way the rubber film is subjected to an increased area of elastic bearing and resisting surface which will roll up or rise in advance of the forwardly-moving mandrel. During such operation, however, the thin rubber film will wrinkle or pucker in advance of the mandrel, but by using an independent mandrel and manually rolling the same along the sheet of film the operators can at any desired moment give the mandrel a short bodily back movement, thereby straightening out the sheet of film, so as to remove not only the wrinkles or puckers formed as a result of the rolling process, but also such wrinkles as may exist as a result of laying the sheet upon the bed, it being observed that all such puckers or wrinkles must be removed in order to form a perfect air-tube. After the multiply air-tube has been formed as aforesaid, it is vulcanized, whereby the plies or layers are united as one sheet, thereby forming a light, seamless, perfect, durable, and highly flexible elastic inflatable inner tire-tube peculiarly adapted for service in a pneumatic tire, in which it is my aim to use the inflatable tube not as an elastic structure or cushion, but simply to prevent the leakage of a body of air which of itself forms the elastic cushion.

In the accompanying drawings, Figure 1 is a plan view of an adhesive sheet of unvulcanized rubber film laid upon an elastic yielding bed-surface with the mandrel placed upon said bed adjacent to the sheet of film preparatory to the operation of rolling the same into a multiply inflatable tire-tube. Fig. 2 is a cross-section through the same on an enlarged scale, with the mandrel slightly advanced, so as to illustrate the mandrel as having taken up a portion of the thin adhesive sheet of film preparatory to rolling the same into tubular form. Fig. 3 is a like view illustrating the formation of the first ply or layer. Fig. 4 is a like view illustrating the formation of a couple of plies about the mandrel. Fig. 5 is a like view showing a three-ply tube formed upon the mandrel. Fig. 6 is a longitudinal section through a portion of the tube formed with three plies of film. Fig. 7 is a view similar to Fig. 1, but showing the mandrel arranged obliquely to the length of the sheet of film. Fig. 8 shows the air-tube in longitudinal section on the scale of Fig. 6, with its middle portion broken away for convenience of illustration. This view indicates a way in which the ends of the tube can be closed after it has been formed upon and removed from the mandrel.

The sheet A of film is formed of unvulcanized rubber, preferably of the kind known as "pure" rubber, and to such end I pass the unvulcanized rubber between suitable rolls, so as to roll out the said material into a thin sheet of film, it being understood that the rolls employed are necessarily calender-rolls and that the sheet of film is calendered by such rolls. As the inflatable air-tube adapted for service in the sheet of a pneumatic tire and made from said film should be perfect, the film is desirably made of pure or substantially pure rubber—that is, rubber free from mineral matter, which for many purposes is mixed with rubber to give body to it; but by employing substantially pure rubber in making the film an inner air-tube formed as herein described from such film can be made with a high degree of perfection. It will also be noted that the more the pure rubber is compounded with other material the heavier it becomes, and as lightness is an important feature I prefer using what is known as "pure" rubber—that is to say, rubber mixed with sulphur. In practice I make these tubes with little or no loss, and in thus making them I have preferred to use a film of about one sixty-fourth of an inch in thickness. I may use a thinner or I could use a slightly thicker film, and hence, while I do not confine myself to the exact thickness of film shown, I desire it, however, to be distinctly understood that I use the term "film" as having a distinctive meaning and distinctive characteristics, in contradistinction to the thin rubber sheets heretofore employed in making air-tubes for pneumatic tires.

The elastic yielding surface is formed by a bed or cushion-table B of any suitable elastic material, it being expressly understood that I do not confine myself to any particular kind of elastic substance or material, but may employ any material or substance adapted to afford an elastic yielding surface or surface having a function and adapted for the purpose of my invention.

In order to form a multiply tube a sheet of the aforesaid sheet of film is laid upon the yielding bed, the length of such sheet being proportioned to the required length of air-tube to be made and its width being proportioned to the number of proposed plies. The independent mandrel is then taken and laid upon the bed alongside one edge of the sheet of film, and is then manually rolled over the sheet of film by several workmen standing alongside the bed, which is understood to be suitably elevated for such purpose.

The manner in which the mandrel C first picks up the film A is illustrated in Fig. 2. The formation of the first ply or layer $a$ is shown in Fig. 3, and the formation of a second ply or layer $a'$ is shown in Fig. 4, wherein the unrolled portion of the elastic sheet A is understood to be sufficient for the formation of a third ply or layer $a^2$. (Represented in Figs. 5, 6, and 8.)

I may form the tube of two or more plies, but in practice I produce a three-ply tube A' with excellent results. This will be apparent from the following: Where the film is, for example, one sixty-fourth of an inch thick and is rolled upon itself to form a three-ply tube, the tube will be three sixty-fourths of an inch thick and at the same time will be composed of three plies or layers united together as one. Should any imperfections therefore have primarily existed in the film, it is not likely that three points of imperfection in the material forming the three plies will be brought into register with one another. It will also be seen that while I produce a light and extremely perfect tube I am particularly enabled to do so by reason of the fact that I use a thin film, which can be more perfectly and readily wrapped upon itself to the exclusion of air-bubbles from between the plies. If I should thicken the film for making a three-ply tube, I must of necessity produce a heavier tube, proportional to the increase in thickness of the film; or if I wish to make a tube of about the thickness of a tube composed of three plies each, say, one sixty-fourth of an inch thick, and use but two plies, the production of such will obviously entail the disadvantage of using a heavier film. Figs. 2, 3, and 4 also illustrate the way in which the elastic yielding surface is depressed during the advancement of the mandrel, the depression shown at $b$ being understood to extend the length of the mandrel. This depression of the elastic yielding surface by and during the travel of the mandrel is of obvious advantage, not only during the formation of the first ply, but particularly during the formation of the succeeding ply or plies, since it is necessary to the production of a perfect article that no air-bubbles shall be left between the plies or layers. By depressing the mandrel during the process of rolling it along the sheet of film the plies will be laid evenly and smoothly and the air will be excluded so effectively from between the plies as to insure their formation without intervening air-bubbles. This method of subjecting the thin sheet of film to an elastic yielding pressure during the process of rolling it to form a multiply tube and of manually handling the mandrel also permits the rolling process to be performed with ease and rapidity and permits the rapid and economical production of a perfect article, it being observed that during such operation the manipulation of the mandrel is subject to the judgment of the workmen whose further duty is to see that no wrinkles are left in the film when rolled.

In practice I employ a set of operators (usually three) who stand constantly alongside a long table having its top provided with a yielding bed. The long narrow sheet of film laid upon the bed in front of these operators is thin, sticky, and flimsy, and to spread it out without wrinkles would involve much care, time, and labor, and, in fact, would be almost impracticable. The sheet of film also invariably puckers or wrinkles in advance of the mandrel during the operation of rolling it into tube forms. These wrinkles must be taken out, and this is done by the operators while rolling up the film. To such end, while rolling up the film, the operators during each operation give the mandrel a short quick back movement, which draws back upon the film and removes the wrinkles. As soon as a tube is rolled it is taken away and another sheet of film and mandrel supplied the operators. In practice three operators can and do roll up from seventeen hundred to two thousand of such tubes a day. After thus forming the tube I remove it from the mandrel by first forcing an air-blast, together with pulverized soapstone or the like, between the tube and mandrel and then withdraw the latter, and by using an independent mandrel the mandrels can be quickly transferred to the workmen who remove the tubes therefrom. In order to close the ends of the tube so that it can be used in a pneumatic tire, I can flatten the end portions of the tube, as at $a^3$ in Fig. 8, and then vulcanize the tube, so as to practically unite the plies or layers as one. The tube can also be vulcanized in a generally flattened condition for certain kinds of tires. I may also roll the thin elastic sheet of film A spirally or obliquely about a mandrel, so as to form in effect a multiply tube, and to such end the mandrel can at the start be arranged obliquely to the length of the sheet of film, as in Fig. 7, it being understood that in such case the elastic yielding bed or surface is necessary for the purposes hereinbefore described, and that the ends of the tube must be cut off after its removal from the mandrel. In all other respects the operation is substantially the same as that hereinbefore described.

While the mandrel, which consists of a straight cylindric rod proportioned with reference to the required size of tube, may be of any suitable material, I provide as a matter of further improvement a mandrel consisting of a rod capable of elastic spring or bending action, so that during the process of rolling up the film the mandrel can be sprung or bent back when such is found desirable as a means for straightening out the sheet of film, so as to remove wrinkles or puckers.

As a matter of further improvement, I provide a mandrel having a wooden surface, and find the same highly advantageous in both of the within-described ways of rolling up the film, since it takes up and handles the same much better than can be attained by employing a metallic mandrel. As a simple and desirable arrangement, I prefer forming the mandrel of some springy wood, in which I combine the advantages of a mandrel capable of elastic bending action and having a wooden surface.

I do not limit myself to any particular material for forming the elastic yielding bed; but in practice I prefer to use a bed comprising hair felt $b'$, covered with cloth or canvas $b^2$, and find the same highly satisfactory.

For the purpose of claim 1 of this application the invention covered by said claim is not limited to manually rolling the mandrel upon the yielding bed-surface or cushion-table, although in view of the important advantages and results attained by the manual process over what could be done by using the mandrel in a machine I regard such manual operation as preferable and as a matter involving further and distinctive improvement and invention.

What I claim as my invention is—

1. The within described process of preparing seamless, inflatable inner air-tubes for pneumatic tires, consisting essentially in the following steps, to wit: forming substantially pure unvulcanized rubber into a thin film; placing upon a cushion table a sheet of said film of sufficient size to form the entire multiply air-tube which is to be produced; forming said sheet into a multiply tube having its plies in direct contact one with another and without air spaces between them, by rolling the film, while lying on the table, upon a mandrel and upon itself, and, during such operation, subjecting the film and plies of film to compression between the table and the mandrel; and vulcanizing the multiply tube thus formed so as to unite the plies of film and adapt the tube for service in a pneumatic tire sheath.

2. The within described process of preparing seamless, inflatable inner air-tubes for pneumatic tires, consisting essentially in the following steps, to wit:—forming substantially pure unvulcanized rubber into a thin film; placing upon a cushion table a sheet of said film of sufficient size to form the entire multiply air-tube which is to be produced; forming said sheet into a multiply tube having its plies in direct contact one with another and without air spaces between them, by manually rolling the film, while lying on the table, upon a mandrel and upon itself, and, during such operation, subjecting the film and plies of film to compression between the table and the mandrel; and vulcanizing the multiply tube thus formed so as to unite the plies of film and adapt the tube for service in a pneumatic tire sheath.

3. The within described process of manufacturing inflatable inner air-tubes for pneumatic tires consisting in forming unvulcanized rubber into a thin film, spreading a sheet of said film upon a cushion table, forming said sheet of film into a multiply tube having its plies in direct contact one with another by rolling it about a mandrel; subjecting the film while being thus rolled to compression between the mandrel and the yielding cushion table, removing wrinkles or gathers in the sheet of film during said operation by stretching the portion of the sheet in advance of the mandrel, and subsequently vulcanizing the multiply tube thus formed so as to unite the plies and adapt it for service in the pneumatic tire-sheath.

4. The within described process of preparing inflatable inner air-tubes for pneumatic tires consisting in spreading a sheet of thin unvulcanized rubber film upon a cushion table, forming said sheet of film into a multiply tube having its plies in direct contact with one another by manually rolling an independent mandrel over the film thus arranged, subjecting the film while being thus rolled to compression between the mandrel and the cushion table; during the formation of the tube upon the mandrel giving the latter a temporary and limited back movement for the purpose of stretching the film in advance of the mandrel, and subsequently vulcanizing the multiply tube thus formed so as to unite the plies and adapt it for service in a pneumatic tire-sheath.

5. The within described process of preparing seamless, inflatable inner air-tubes for pneumatic tires, consisting essentially in the following steps, to wit:—forming substantially pure unvulcanized rubber into a thin film; placing upon a cushion table a sheet of said film of sufficient size to form the entire multiply air-tube which is to be produced; forming said sheet into a multiply tube having its plies in direct contact one with another and without air spaces between them, by rolling the film, while lying on the table, upon a mandrel and upon itself, and, during such operation, subjecting the film and plies of film to compression between the table and the mandrel; removing the multiply tube thus formed from the mandrel by forcing air carrying powdered soap-stone or the like in between the mandrel and tube so as to permit the mandrel to be drawn from the tube, and vulcanizing the multiply tube thus formed so as to unite the plies of film and adapt the tube for service in a pneumatic tire sheath.

6. An apparatus for preparing inner inflatable air-tubes for pneumatic tires from unvulcanized rubber film consisting in a cushion table adapted to receive a sheet of unvulcanized rubber film from which the said tube is to be made, and an independent flexible mandrel upon which the film can be rolled to form a multiply air-tube, substantially as and for the purpose described.

7. An apparatus for preparing inner inflatable air-tubes for pneumatic tires from unvulcanized rubber film consisting in a cushion table adapted to receive a sheet of unvulcanized rubber film from which the said tube is to be made and an independent flexible wooden mandrel upon which the film can be rolled to form a multiply air-tube, substantially as and for the purpose described.

8. As an improved article of manufacture, a seamless, multi-ply elastic inner air-tube for pneumatic tires formed of a single sheet of thin rubber film rolled upon itself, having the plies united as a single sheet, substantially as described.

FRED W. MORGAN.

Witnesses:
RETA M. WAGNER,
R. M. ELLIOTT.